Nov. 3, 1970  D. L. GALLOWAY  3,538,440
VOLTAGE DETECTOR FOR SHIELDED CONDUCTOR PROVIDING
SUBSTANTIALLY CONSTANT OUTPUT VOLTAGE OVER
WIDE RANGE OF INPUT VOLTAGE

Filed Aug. 30, 1968  2 Sheets-Sheet 1

WITNESSES:
Bernard R. Sieguy
James H. Young

INVENTOR
Dudley L. Galloway
BY
Donald R. Lackey
ATTORNEY

Nov. 3, 1970   D. L. GALLOWAY   3,538,440
VOLTAGE DETECTOR FOR SHIELDED CONDUCTOR PROVIDING
SUBSTANTIALLY CONSTANT OUTPUT VOLTAGE OVER
WIDE RANGE OF INPUT VOLTAGE
Filed Aug. 30, 1968   2 Sheets-Sheet 2

_United States Patent Office_

3,538,440
Patented Nov. 3, 1970

3,538,440
VOLTAGE DETECTOR FOR SHIELDED CONDUCTOR PROVIDING SUBSTANTIALLY CONSTANT OUTPUT VOLTAGE OVER WIDE RANGE OF INPUT VOLTAGE
Dudley L. Galloway, Sharon, Pa., assignor to Westinghouse Electric Corporation, Pittsburgh, Pa., a corporation of Pennsylvania
Filed Aug. 30, 1968, Ser. No. 756,638
Int. Cl. G01r 19/16
U.S. Cl. 324—133                                  11 Claims

ABSTRACT OF THE DISCLOSURE

A voltage detector for detecting the presence of voltage on a conductor, which provides a substantially constant voltage at a probe test point, over a wide range of conductor voltage.

BACKGROUND OF THE INVENTION

Field of the invention

The invention relates in general to voltage detectors, and more specifically to a voltage detector for providing a voltage at a probe test point indicative of the presence of voltage on an electrical conductor.

Description of the prior art

Shielded electrical cable is used extensively in electrical power distribution systems, especially underground. The grounded shield on the cable is usually continued to the grounded casing of the apparatus it is connected to, through an appropriate plug-in type connector, which confines the electric field between the conductor and the grounded shield. All live conductors and terminals are thus electrically insulated and shielded, which prevents operating personnel from coming into accidental contact with high potentials. While completely insulated and shielded cable and terminals are necessary for safety, and also to protect underground apparatus from outages due to flooding of the vaults, conventional methods of detecting whether or not the cable and terminals are energized are ineffective. Since the electric field is completely shielded, glow tubes disposed near the cables and terminals will not indicate whether or not they are energized. Since most cable terminations are not designed to open or close an electrical circuit while it is carrying current, it is essential that some means be provided which will enable operating personnel to quickly and easily determine whether or not a shielded conductor is energized.

U.S. Pat. 3,328,690, issued June 27, 1967, which is assigned to the same assignee as the present application, discloses the placement of a glow tube between the conductor and shield, on shielded electrical cable, where it will be subjected to the electric field. The shield is either perforated at this point, to allow the lamp to be observed, or a transparent polymer rod may be used to transmit the light from the glow tube to the outer surface of the cable.

Co-pending application Ser. No. 489,339, filed Sept. 22, 1965, which is assigned to the same assignee as the present application, discloses an electrical plug-in type bushing for shielded cable, which has a capacitive shield embedded therein, about the conductor stud, which is electrically connected to a terminal or probe test point disposed on the outer surface of the bushing.

In the first mentioned prior art method, the intensity of the light emitted by the glow lamp varies with the magnitude of the voltage on the conductor, and in the second mentioned method, the voltage available at the probe test point varies with the voltage on the conductor. Thus, while voltage detectors of these types operate satisfactorily at the rate voltage of the conductor, they may not indicate the presence of an abnormally low voltage.

SUMMARY OF THE INVENTION

Briefly, the present invention is a new and improved voltage detector of the capacitive type which provides a substantially constant voltage at a probe test point, over a wide range of conductor voltages. In certain embodiments of the invention, capacitive developed voltages are provided while utilizing insulating materials having a non-linear dielectric constant, which varies inversely with the electrical stress applied thereto. In other words, the lower the electrical stress, and thus the voltage on the conductor, the higher the dielectric constant of the material. Thus, the electrical charge stays substantially constant across the capacitive structure, while the voltage on the conductor is decreasing, due to the increasing capacitance. In another embodiment of the invention, voltages are capacitively developed by using variable capacitance semiconductor diodes. As the voltage across the diode decreases, its capacitance increases, thus enabling the capacitive charge to remain substantially constant over a wide range of conductor voltages. Still another embodiment of the invention provides a capacitance which will provide the desired voltage at the probe test point for the lowest conductor voltage to be indicated. A constant voltage at the probe test point is maintained while the conductor has higher potentials applied thereto, by connecting Zener type semiconductor diodes from the probe test point to the grounded cable shield.

BRIEF DESCRIPTION OF THE DRAWING

Further advantages and uses of the invention will become more apparent when considered in view of the following detailed description and drawings, in which.

DESCRIPTION OF PREFERRED EMBODIMENTS

In general, the invention is a new and improved voltage detector arrangement for indicating the presence of voltage on electrical conductors, which includes means for providing a substantially constant voltage at a terminal which may be used as a probe test point. This substantially constant voltage at the probe test point terminal is maintained over a wide range of conductor voltages. While the invention is described specifically to voltage detectors for shielded electrical conductors, it will be obvious that the teachings of the invention may be applied anywhere it is desirable to provide an indication of the existence of voltage on a conductor which is disposed such that it is not readily accessible to other means of detection.

Figure 1:
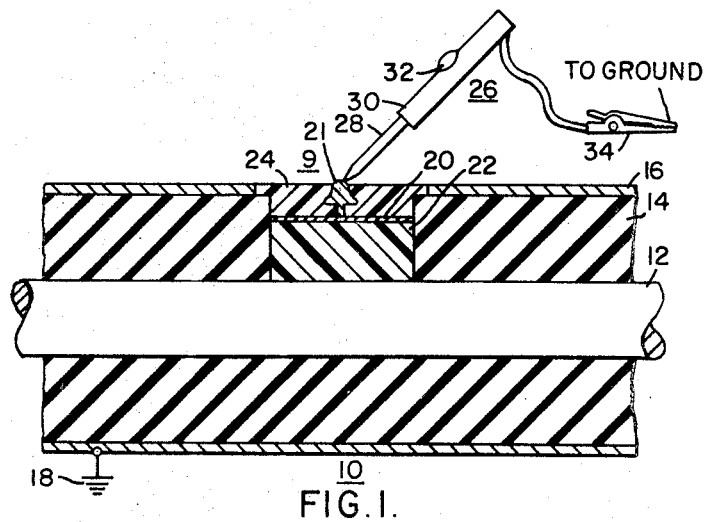
FIG. 1 is a cross-sectional view of a shielded electrical conductor illustrating a voltage detector arrangement constructed according to an embodiment of the invention which utilizes a non-linear dielectric material.

Referring now to the drawings, in which the various figures illustrate exemplary embodiments of the invention, FIG. 1 illustrates a voltage detector arrangement 9 for detecting the presence of voltage on shielded cable 10. The shielded cable 10 includes electrical conductor means 12, which is adapted for connection to an electrical potential, solid electrical insulating means 14, disposed uniformly about conductor means 12, and in contact therewith, and shielding means 16 disposed uniformly about insulating means 14, and in contact therewith. The construction and materials used for the manufacture of shielded electrical cables are well known in the art. For example, conductor means 12 may be copper or aluminum, insulating means 14 may be non-conductive rubber, and shielding means 16 may be conductive rubber, or a metallic shield of any suitable type.

In general, voltage detector 9 includes a metallic capacitor plate 20, solid insulating material 22, having a non-linear dielectric characteristic, disposed between capacitor plate 20 and electrical conductor 12, and a probe test point or terminal means 21, which is electrically connected to the capacitor plate 20. The construction of voltage detector means 9 requires that the shielded electrical cable be prepared by the removal of a predetermined portion of the electrical shielding means 16, and also the removal of the solid insulating means 14, starting with the portion of the solid insulating means 14 exposed by the removal of the shielding means 16, and extending completely to the electrical conductor 12. The solid insulating material 22 is then disposed within the opening created by the removal of the solid insulating means 14, and capacitor plate 20 is disposed on the outer surface of the solid insulating material 22. Capacitor plate 20 may be secured and sealed in the desired operating position by a suitable adhesive 24, such as an epoxy resin system. The resin system 24 will seal the cable against the entrance of moisture, and will prevent the introduction of the voltage detector 9 into the cable from seriously affecting the electrical characteristics of the cable. The construction of the terminal means 21, which is electrically connected to capacitor plate 20, should be such that it will extend slightly above the surface of the resin sealing means 24.

Capacitor plate 20 may be flat, curved, or it may even be completely tubular in shape, as will be described relative to other embodiments of the invention. Capacitor plate 20 may have a solid wall portion, or it may be perforated, such as a screen, or it may even be a conductive coating sprayed on a pre-cast insulating cylinder which is disposed about the electrical conductor 12.

The solid insulating material 22 having a non-linear dielectric characteristic, should have a dielectric constant which is inversely proportional to the electric field strength between electrical conductor 12 and capacitor plate 20. Ferroelectric materials possess non-linear dielectric characteristics with voltage, with the most important group of ferroelectric materials being comprised of the oxygen octahedra-type compounds. Members of this group include several titanates, tantalates, niobates, vanadates, fenates, gallates, stannates, zirconates, and mixtures or solid solutions thereof. These materials may be prepared in ceramic form or as a filled enamel, or in any other suitable form capable of providing the dielectric for the capacitor function of the voltage detector 9, without detracting from the electrical characteristics of the cable 10.

Figure 2:
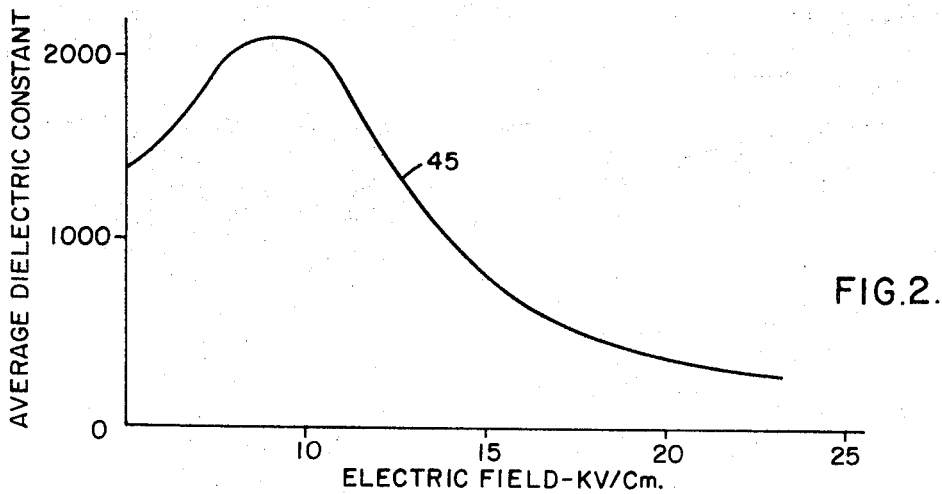
FIG. 2 is a graph which plots the average dielectric constant versus electric field strength for a non-linear dielectric material which may be used in the voltage detector shown in FIG. 1.

The most widely used ferroelectric material is barium titanate ($BaTiO_3$). FIG. 2 is a graph which illustrates the average dielectric constant of a barium titanate ceramic, versus electric field strength in kilovolts per centimeter. It will be noted by observing the curve 45 in FIG. 2, that the dielectric constant of barium titanate increases with an increasing electrical field up to about 10 kilovolts per centimeter, and then the dielectric constant becomes progressively less as the field strength is increased. Thus, by designing the voltage detector 9 such that the lowest voltage to be detected on conductor 12 will provide a field strength of approximately 10 kv. per centimeter, the maximum capacitance will be provided at the lowest voltage to be detected. When the electric field strength is increased from 10 kv. per centimeter, curve 45 is substantially a straight line, having an angle of approximately 45° with the horizontal. Thus, the capacitance of the capacitor formed by conductor 12 and capacitor plate 20 will increase at about the same rate the electric field is decreased. Therefore, the charge on the capacitor will be substantially constant over this voltage range since the charge on a capacitor is related to the capacitance and voltage as follows: $Q=CE$, in which Q is the charge in coulombs, C the capacitance in farads, and E the potential difference in volts. If C increases at the same rate that E decreases, the charge Q will remain constant. Since the charge Q remains constant, the voltage available at terminal means 21 will be substantially constant over this same voltage range. The voltage level present at terminal means 21 may be indicated with a simple probe 26, which includes a metallic contact point 28, an insulating body 30 which contains a glow lamp 32, and a ground lead 34. When the ground lead 34 is connected to ground and the probe contact point 28 is in contact with the terminal means 21, the glow lamp 32, which is serially connected between the contact point 28 and the ground lead 34, will glow with an intensity proportional to the voltage level present at terminal means 21.

Figure 1A:
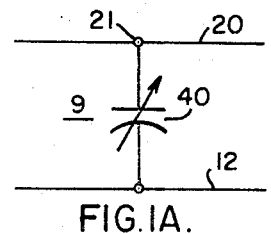
FIG. 1A is a diagram which schematically illustrates the voltage detector arrangement shown in FIG. 1.

The voltage detector 9 is schematically illustrated in FIG. 1A, indicating a variable capacitor 40 connected between electrical conductor 12 and capacitor plate 20.

Figure 3:
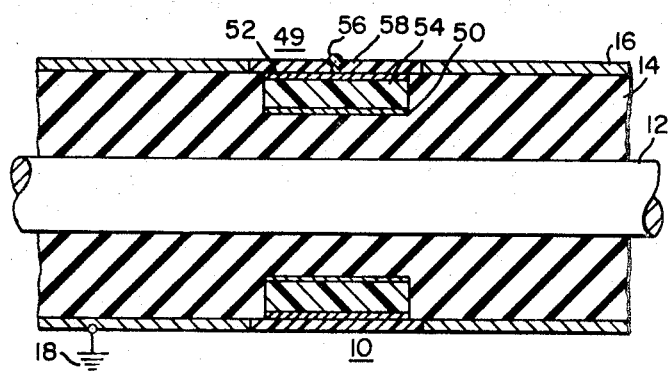
FIG. 3 is a cross-sectional view of a shielded electrical conductor, illustrating a voltage detector constructed according to another embodiment of the invention which utilizes a non-linear dielectric material.

In the voltage detector arrangement 9 shown in FIG. 1, the dielectric material 22, having the non-linear dielectric characteristic, completely replaces a section of the linear solid insulating means 14, between the conductor 12 and the shielding means 16. FIG. 3 illustrates another embodiment of the invention, in which first and second capacitor plates are utilized, to provide first and second serially connected capacitors, with the first capacitor utilizing the solid insulating means 14, which has a linear dielectric characteristic, and with the second capacitor utilizing solid insulating material having a non-linear dielectric characteristic, as hereinbefore described relative to FIG. 1. More specifically, FIG. 3 illustrates a voltage detector arrangement 49 applied to an electrical cable 10, with like reference numerals in FIGS. 1 and 3 indicating like components. Voltage detector arrangement 49 includes a first capacitor plate 50, disposed in spaced relation about electrical conductor 12, and a second capacitor plate 52, which is disposed in spaced relation about the first capacitor plate 50. In this embodiment of the invention, the capacitor plates 50 and 52 are illustrated as being tubular, but they may be flat plates, or curved plates, as hereinbefore described relative to FIG. 1. In the embodiment of the invention shown in FIG. 3, a tubular section of shielding means 16 is removed from the electrical cable 10, and the solid insulating means 14, exposed by the removal of the predetermined portion of shielding means 16, is removed to a predetermined depth, which depth is less than the radial thickness of the insulating means 14. After the section of shielding means 16 is removed, and the immediately underlying portion of the solid insulating means 14, capacitor plate 50 may be placed in position adjacent the outer surface of the solid insulating means 14. Then, insulating material 54 having a non-linear dielectric characteristic is disposed about capacitor plate 54, providing a radial build which is slightly less than the OD of the electrical cable 10. The second capacitor plate 52 is then disposed about the solid insulating material 54, and it may be sealed in position by suitable resin adhesive means 58, such as an epoxy resin system. The second or outer capacitor plate 52 has terminal means 56 connected thereto, which extends outwardly past the sealing means 58, to provide a probe test point.

Figure 3A:
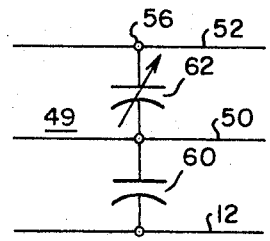
FIG. 3A is a diagram which schematically illustrates the voltage detector arrangement shown in FIG. 3.

FIG. 3A schematically illustrates the voltage detector arrangement 49 shown in FIG. 3, illustrating a first capacitor 60, which has a fixed value, disposed between electrical conductor 12 and the first capacitor plate 50. A second capacitor 62, which has a voltage responsive capacitance, is formed between the first capacitor plate 50 and the second capacitor plate 52. This arrangement of serially connecting a fixed capacitor with a capacitor whose magnitude may vary, may be desirable, in certain applications in order to limit the electrical stress across each capacitor.

Figure 4:
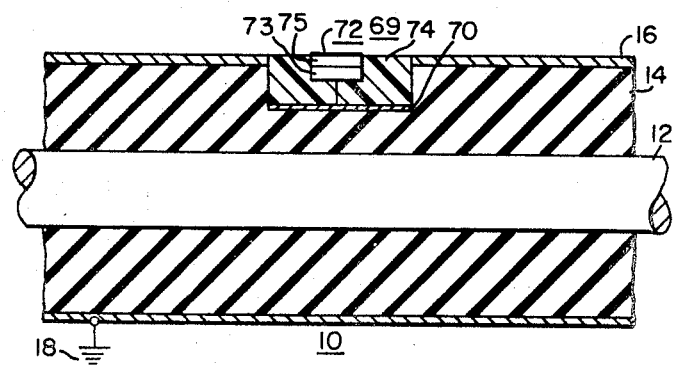
FIG. 4 is a cross-sectional view of a shielded electrical conductor, illustrating a voltage detector arrangement constructed according to an embodiment of the invention which utilizes variable capacitance semiconductor diodes.

The embodiments of the invention shown in FIGS. 1 and 3 utilize a dielectric material having a dielectric constant which varies inversely with the magnitude of an electrical field applied thereto. A constant votlage may be provided at the probe test terminal by utilizing other means having a variable capacitance which is inversely proportional to voltage. FIG. 4 illustrates an embodiment of the invention which utilizes the variable capacitance of semiconductor PN junctions to provide a voltage detector arrangement 69. Voltage detector arrangement 69 includes a capacitor plate 70, disposed in spaced relation with electrical conductor 12, and a diode arrangement 72 comprising first and second serially connected diodes 73 and 75, connected back to back, with diode 73 being electrically connected to capacitor plate 70, and diode 75 providing the probe test point.

Voltage detector arrangement 69 may be formed by removing a predetermined section of shielding means 16, and also a predetermined portion of the solid insulating means 14 which is exposed by the removal of the insulating means 16. The insulating means 14 is removed to a predetermined depth, which depth may be less than the radial dimension of insulating means 14, in order to utilize solid insulating means 14 for the dielectric material for a first capacitor. After the solid insulating means 14 is removed, capacitor plate 70 is disposed against the solid insulating means within the depression, the back to back diodes 73 and 75 may be disposed within the opening, and then the opening filled with a solid resinous insulating means 74, such as an epoxy resin. The diode assembly 72 may be positioned within the opening such that one of the electrodes of the diode is accessible from the outer surface of the cable 12, to provide a probe contact point, or the diode assembly may be connected to a separate terminal.

The semiconductor diodes 73 and 75 may be the variable capacitor diodes commonly called varactors, which is the name generally given to the semiconductor junction which has a useful non-linear reverse-bias capacitance, or they may be semiconductor diodes of the Zener type. A Zener diode, operated with a reverse voltage less than its reverse voltage breakdown rating, displays a capacitance that decreases with increasing reverse voltage. The capacitance of a Zener diode is inversely proportional to the square root of the applied voltage. The use of Zener diodes will also limit the maximum voltage across the pair to their reverse breakdown ratings in the event of an abnormally high voltage on the shielded conductor.

Figure 4A:
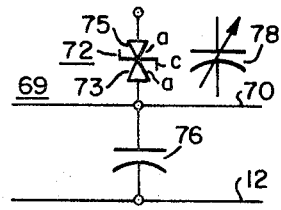
FIG. 4A is a diagram which schematically illustrates the voltage detector arrangement shown in FIG. 4.

FIG. 4A is a schematic representation of the voltage detector arrangement 69, illustrating a fixed capacitance 76 formed between electrical conductor 12 and capacitor plate 70, and a serially connected variable capacitor 78, provided by the semicondutcor diode arrangement 72. Semiconductor diodes 73 and 75 may have their cathode electrodes connected in common, with the anode electrical of diode 73 being connected to capacitor plate 70, and the anode electrode of diode 75 being connected to the probe test terminal.

Figures 5, 5A:
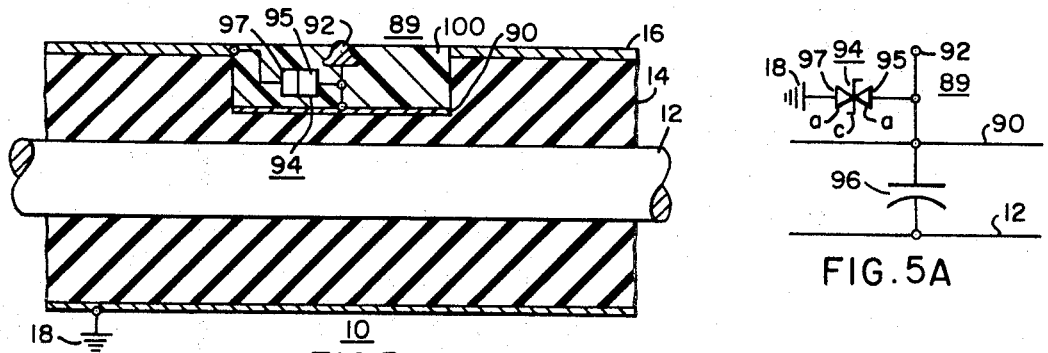
FIG. 5 is a cross-sectional view of a shielded electrical conductor illustrating a voltage detector arrangement constructed according to an embodiment of the invention which utilizes voltage regulating type semiconductor diodes.
FIG. 5A is a diagram which schematically illustrates the voltage detector arrangement shown in FIG. 5.

All of the embodiments of the invention hereinbefore described have operated on the principle of varying the capacitance of a capacitor inversely with the voltage applied to the electrical conductor 12. FIG. 5 illustrates another embodiment of the invention in which a substantially constant voltage is maintained at the probe test terminal, without varying the capacitance of the capacitive pickup. More specifically, FIG. 5 illustrates a voltage detector arrangement 89, applied to an electrical cable 10, which includes a capacitor plate 90, a probe test point 92, which is electrically connected to capacitor plate 90, and a pair 94 of serially connected Zener diodes 95 and 97, which are connected back-to-back between terminal 92 and ground 18. The cable 10 is prepared by removing a predetermined section of shielding means 16, and a portion of the solid insulating means 14 which is disposed immediately under the removed section of shielding means 16. Solid insulating means 14 is removed to a depth which is less than the radial build of the solid insulating means 14, in order to utilize solid insulating means 14 as the dielectric for the capacitor formed by capacitor plate 90 and electrical conductor 12. After the solid insulating means 14 is removed to a predetermined depth, capacitor plate 90 may be disposed with its surface against the surface of the exposed solid insulatng means 14, terminal means 92 may be connected to capacitor plate 90, and the Zener diode assembly 94 may be connected between shielding means 16 and the terminal 92. The Zener diode assembly 94 and terminal 92 may be secured in their relative positions, and the opening in the cable 12 sealed, by introducing a resinous solid insulating material 100 into the opening formed by the removal of the solid insulating means 14, with the terminal 92 being disposed such that it will extend above the surface of the solid insulating and sealing means 100.

FIG. 5A schematically illustrates the voltage detector arrangement 89 shown in FIG. 5, with a capacitance 96 being developed between electrical conductor 12 and capacitor plate 90. The value of capacitance 96 is selected such that it will provide a voltage at terminal 92 which is adequate for energizing the indicating means in the particular probe utilized to indicate the presence of voltage. The Zener diode arrangement 94 is then connected from the terminal 92 to ground 18, with the anode electrode of diode 95 being connected to terminal 92 and the anode electrode of diode 97 being connected to ground 18. The reverse breakdown voltage ratings of Zener diodes 95 and 97 are selected to clamp the voltage of terminal 92 to approximately the voltage which appears at terminal 92 in response to the minimum magnitude of voltage on conductor 12 to be detected. Thus, as the voltage on conductor 12 increases, the voltage at terminal 92 will be clamped to the reverse breakdown voltage ratings of the Zener diode arrangement 94.

While the diode arrangements 72 and 94 in FIGS. 4 and 5, respectively, have been illustrated as being incorporated within the electrical cable 10, it is to be understood that these diode arrangements may also be incorporated into the probe, which is used to indicate the presence of voltage at the terminal means of the electrical cable 10.

The hereinbefore described embodiments of the invention have been illustrated relative to the detection of voltage on a shielded cable, and the embodiments of the invention utilizing capacitance have been illustrated with solid dielectric material. The invention should not be limited to these specific structural arrangements, however, as it applies to the detection of voltage on any electrical conductor, and the dielectric material for the capacitance is not limited to solid insulation means. For example, FIG. 6 illustrates an embodiment of the invention, similar to the embodiment shown in FIG. 3, except the presence of voltage on an electrical bushing is detected, and liquid insulating means is used to provide a portion of the dielectric for the fixed capacitance portion of the voltage detector.

Figure 6:
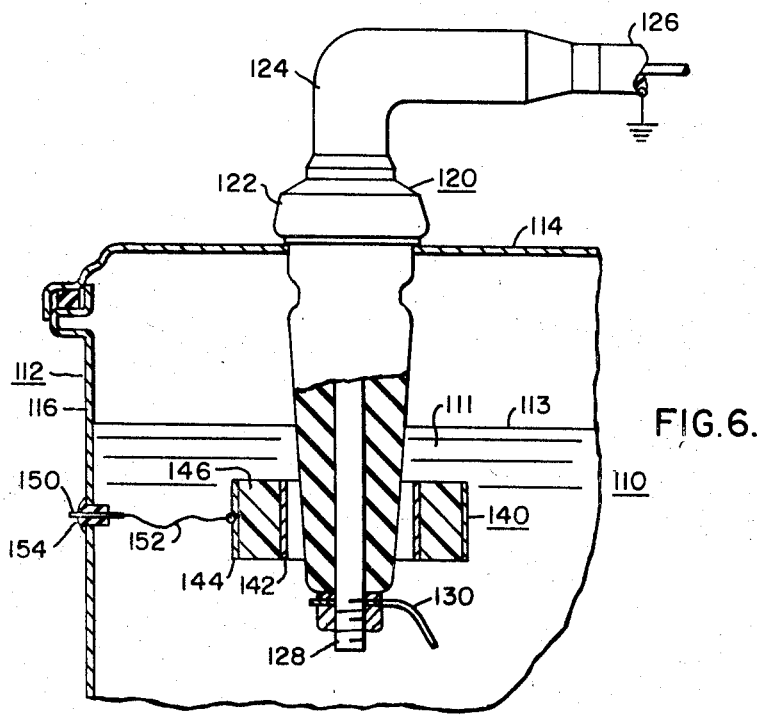
FIG. 6 is an elevational view, partially in section, of electrical inductive apparatus, incorporating a voltage detector constructed according to another embodiment of the invention.

More specifically, FIG. 6 is a fragmentary, elevational view of electrical apparatus 110, such as a transformer, having a metallic casing 112 which includes a cover 114 and sidewall portion 116, and an electrical bushing assembly 120. A suitable insulating and cooling dielectric, such as oil, is disposed within the casing 112, to a suitable level 113. Bushing assembly 120, which is disposed in sealed relation through an opening in the casing 112, includes a substantially cylindrical, elongated body portion 122, and a removable plug-in portion 124. Plug-in portion 124 is connected to shielded electrical cable 126, with the plug-in portion 124 and body portion 122 being constructed to continue the grounded cable shield to the casing 112. Thus, conventional methods of detecting the presence of voltage on cable 126 are ineffective.

Body portion 122 includes a co-axially extending conductor stud 128, which is connected within the casing 112 to the encased electrical apparatus, and outside the casing to the conductor within the plug-in connector 124.

Instead of modifying the shielded cable 126, or plug-in connector 124, capacitive pick-up means 140 is concentrically disposed about the encased cylindrical portion of bushing assembly 120. Pick-up means 140 includes first and second capacitor plates 142 and 144, respectively, disposed in concentric spaced relation about conductor stud 128. The first capacitor plate 142 may be spaced from the solid insulation surrounding the stud 128, if desired, with the dielectric of the capacitance formed between the stud 128 and the first capacitor plate 142 being formed of solid insulation; and also the liquid dielectric 111 disposed within casing 112. Or, the first capacitor plate may be disposed against the outer surface of the solid insulation surrounding stud 128. The space between the first and second capacitor plates 142 and 144 is filled with solid insulation means, which is selected to have a non-linear dielectric constant which varies inversely with the electrical stress applied thereto. This solid insulation means may be selected from the materials hereinbefore described relative to FIGS. 1 and 3.

The second capacitor plate 144 is connected to a probe contact terminal 150, via conductor 152. Terminal 150 is insulatingly mounted through an opening in casing 112, such as through bushing 154.

The voltage developed on capacitor plate 144 is constant over a predetermined range of voltage on conductor stud 128, due to the value of the capacitance between plates 142 and 144 changing as the voltage on stud 128 changes. The voltage developed on the second capacitor plate 144 is connected to the probe contact terminal 150, where operating personnel may conveniently check to determine if cable 126 is energized.

In summary, there has been disclosed new and improved voltage detector arrangements for indicating the presence of an electrical potential on an electrical conductor. The disclosed voltage detector arrangements have advantages over certain prior art voltage detector arrangements, in that the voltage will not decrease substantially as the voltage on the electrical conductor decreases. Thus, the useful voltage indicating range of the voltage detectors disclosed herein has been extended beyond the ranges over which prior art voltage detector arrangements are effective, which enables the presence of voltage on a conductor to be indicated, even when an abnormally low voltage is being applied to the electrical conductor.

Since numerous changes may be made in the above described apparatus and different embodiments of the intion may be made without departing from the spirit thereof, it is intended that all matter contained in the foregoing description or shown in the accompanying drawings shall be interpreted as illustrative, and not in a limiting sense.

I claim as my invention:

1. A voltage detector comprising:
    an electrical conductor adapted for connection to an electrical potential,
    shielding means disposed about and spaced from said electrical conductor, at least one capacitor plate disposed in predetermined spaced relation with said electrical conductor, between said shielding means and said conductor,
    terminal means connected to said at least one capacitor plate, whereby a voltage is produced at said terminal means when current flows in said conductor, said terminal means being adapted for connection to a voltage indicator, and means continuously maintaining said produced voltage substantially constant at said terminal means, when said electrical conductor is connected to an electrical potential which may vary substantially in magnitude over a predetermined range.

2. The voltage detector of claim 1 wherein the means for providing a substantially constant voltage at the terminal means includes insulating means disposed between the at least one capacitor plate and the electrical conductor, said insulating means having a dielectric constant which is inversely proportional to the magnitude of an electrical field applied thereto, whereby the capacitance formed between the at least one capacitor plate and the electrical conductor increases as the potential applied to the electrical conductor is reduced to maintain substantially the same electrical charge on the capacitance over a predetermined range of conductor potential.

3. The voltage detector of claim 2 wherein the insulating means having the non-linear dielectric constant includes a ferroelectric material.

4. The voltage detector of claim 3 wherein the ferroelectric material includes barium titanate.

5. The voltage detector of claim 1 including an additional capacitor plate disposed between the at least one capacitor plate and the electrical conductor, and wherein the means for providing a substantially constant voltage at the terminal means includes insulating means disposed between the at least one capacitor plate and said additional capacitor plate, said insulating means having a dielectric constant which is inversely proportional to the magnitude of an electrical field applied thereto, whereby the capacitance formed between the at least one capacitor plate and said additional capacitor plate increases as the electrical potential applied to the electrical conductor decreases.

6. The voltage detector of claim 5 wherein the insulating means having the non-linear dielectric constant is a ferroelectric material.

7. The voltage detector of claim 6 wherein the ferroelectric material includes barium titanate.

8. The voltage detector of claim 1 wherein the means providing a susbtantially constant voltage at the terminal means includes semiconductor diode means having a capacitance which varies inversely with the voltage applied thereto, said semiconductor diode means being connected between the terminal means and the at least one capacitor plate.

9. The voltage detector of claim 8 wherein the semiconductor diodes include two, serially connected Zener type diodes connected back-to-back, with said Zener type diodes being selected such that the maximum voltage applied thereto will usually be less than their reverse breakdown voltages.

10. The voltage detector of claim 8 wherein the semiconductor diode means includes two, serially connected varactor diodes, connected back-to-back.

11. The voltage detector of claim 1 wherein the means for providing a substantially constant voltage at the terminal means includes two serially connected Zener type semiconductor diodes connected back-to-back, between said electrical shielding means and the terminal means, said Zener type diodes being selected such that the voltage applied thereto will exceed their reverse breakdown ratings, to provide a substantially constant voltage at the terminal means.

References Cited

UNITED STATES PATENTS

| | | |
|---|---|---|
| 2,405,121 | 8/1946 | Fehr. |
| 2,443,094 | 6/1948 | Carlson et al. |
| 2,789,254 | 4/1957 | Bodle et al. |
| 2,808,566 | 10/1957 | Douma _____ 324—127 |
| 2,854,651 | 9/1958 | Kircher. |
| 3,311,817 | 3/1967 | Glanc _____ 323—93 |
| 3,346,805 | 10/1967 | Hekimian _____ 323—93 XR |
| 3,412,392 | 11/1968 | Jenkins et al. ____ 324—133 XR |
| 3,443,158 | 5/1969 | Arndt _____ 324—52 XR |

FOREIGN PATENTS 188,625  4/1964  Sweden.

GERARD R. STRECKER, Primary Examiner

U.S. Cl. X.R.

317—255; 323—93; 324—126